Inventor
Walter W. Danuser by Parker & Carter
Attorneys

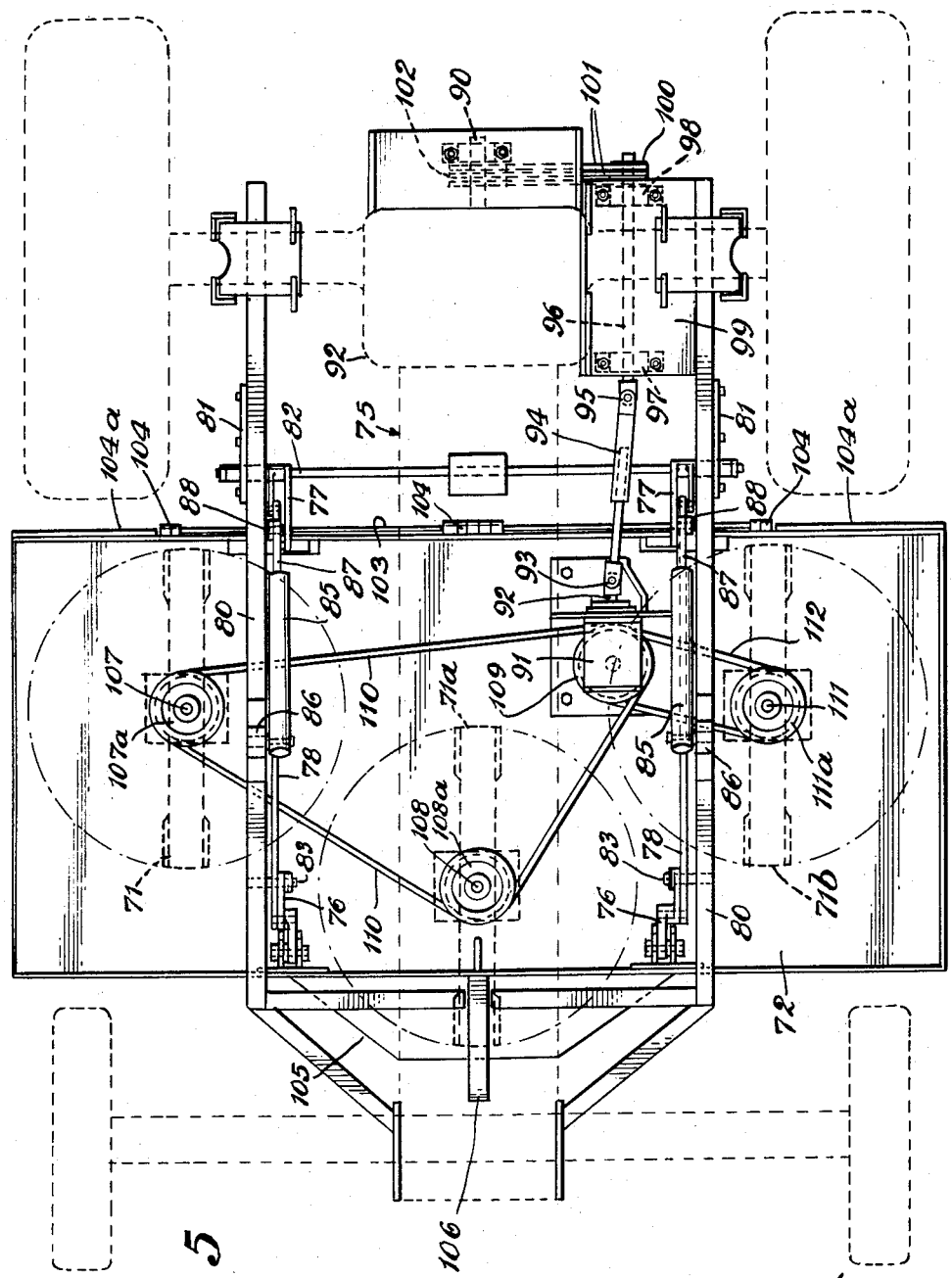

United States Patent Office 2,928,223
Patented Mar. 15, 1960

2,928,223

TRACTOR MOUNTED ROTARY MOWER ATTACHMENT

Walter W. Danuser, Tulsa, Okla., assignor to Danuser Machine Works, Inc., Tulsa, Okla., a corporation of Oklahoma Application July 20, 1956, Serial No. 599,167

3 Claims. (Cl. 56—25.4)

This invention relates to improvements in rotary mower attachments for tractors, and more particularly to mower attachments of the kind adapted for suspension between the front and rear wheels of conventional or commercial farm-type tractors for cutting a swath of substantially the width of the tractor.

Mower attachments of the character described heretofore have usually been designed for use with several different commercial tractors, said attachments being mounted for support on such tractors by varying forms of auxiliary frame members as required by the different structural arrangements of such conventional tractors.

One of the principal objects of the present invention is to provide a rotary mower attachment of simple, economical and durable construction which is particularly adapted for use with several different forms of tractors requiring little or no substantial change in the main parts of the raising and lowering mechanism and with a minimum change in the auxiliary attaching framework, and means for connecting the driving elements of the mower with the power take-offs on different tractors. Further objects of the invention will appear from time to time as the following description proceeds.

This invention may best be understood by reference to the accompanying drawings, in which—

Figure 5 is a plan view of the mower attachment shown in Figure 4; and

Figure 6 is an enlarged front view of the mower attachment shown in Figure 4.

Figure 1:
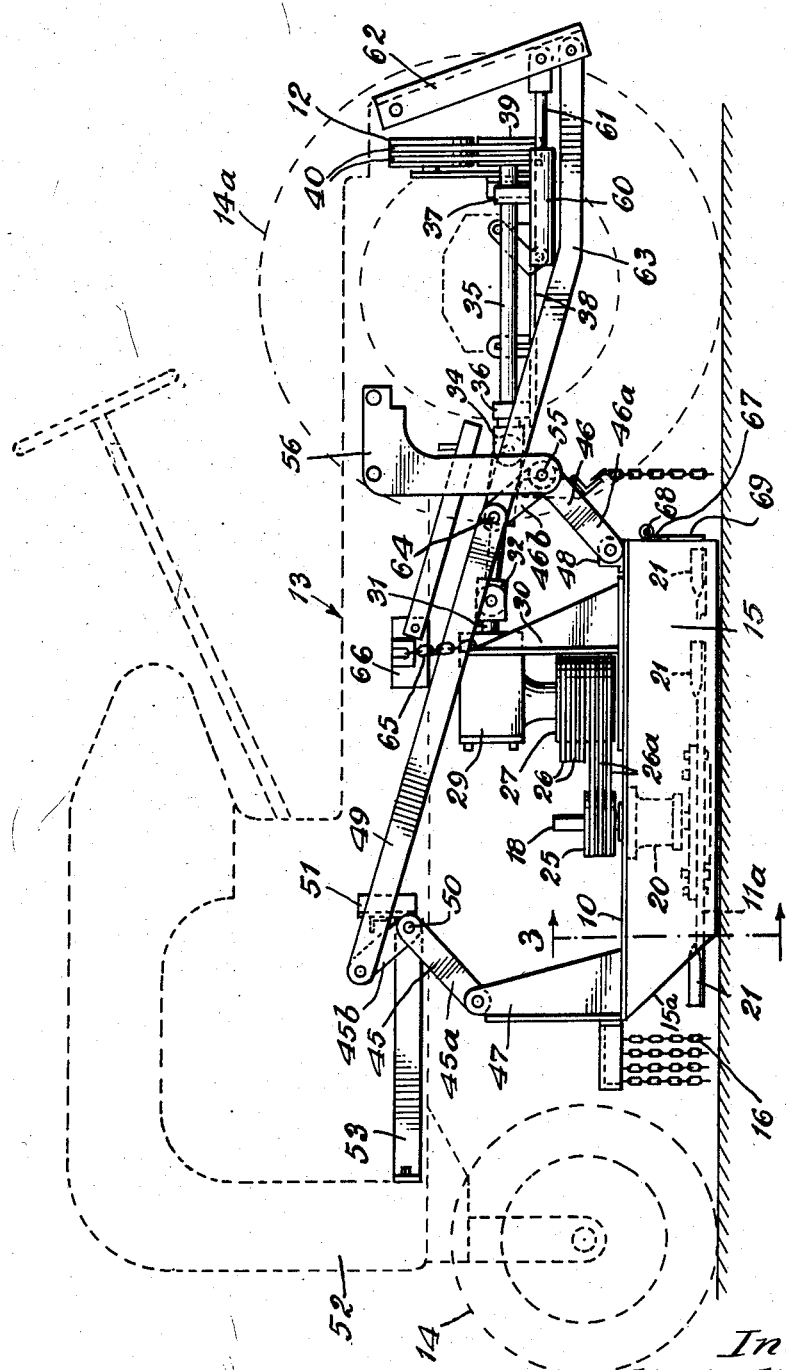
Figure 1 is a side view of a mower attachment having two rotary mower blades and constructed in accordance with my invention, together with its auxiliary supports for mounting on a conventional tractor shown in phantom.
Figure 2:
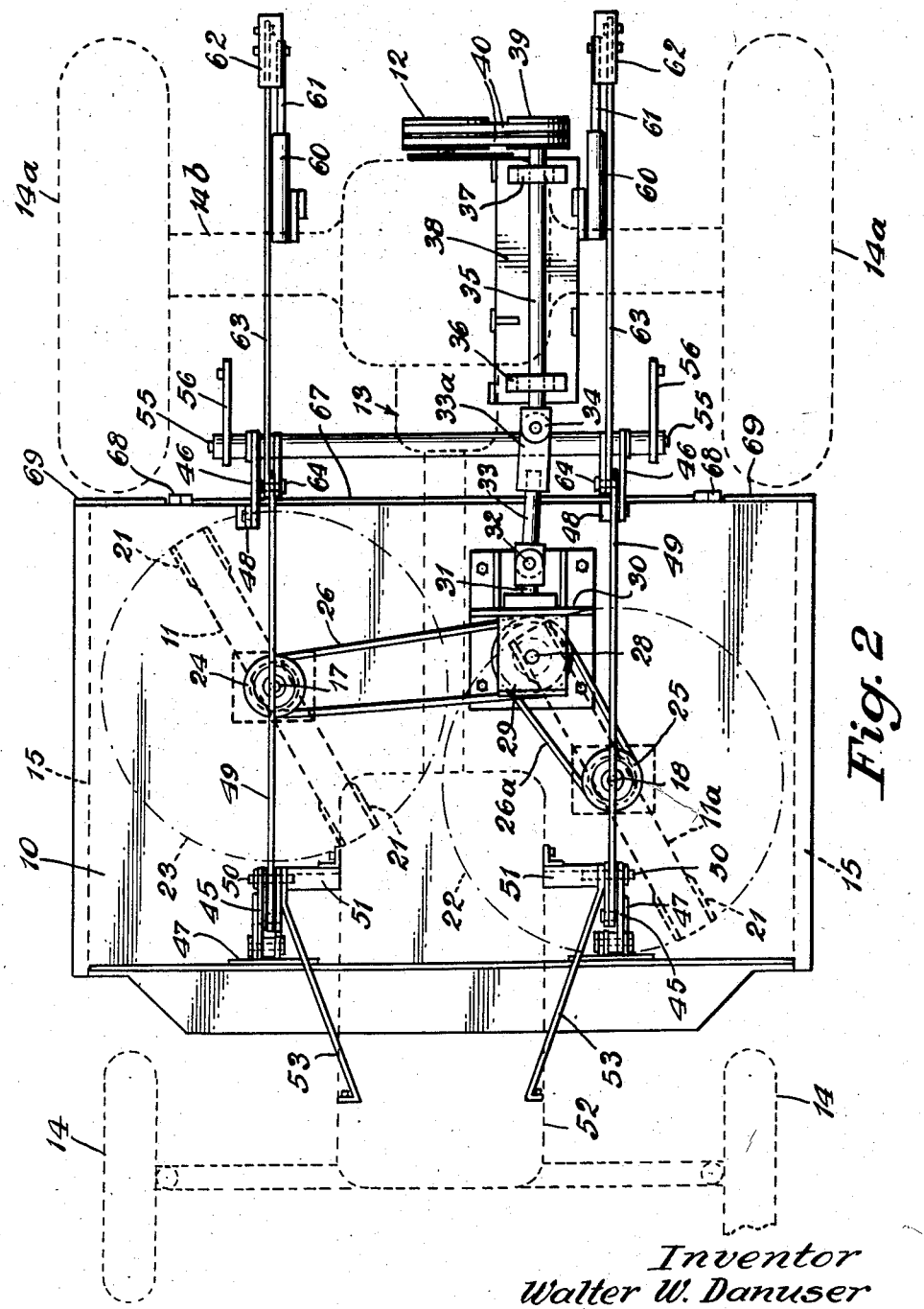
Figure 2 is a plan view of the mower attachment shown in Figure 1.
Figure 3:
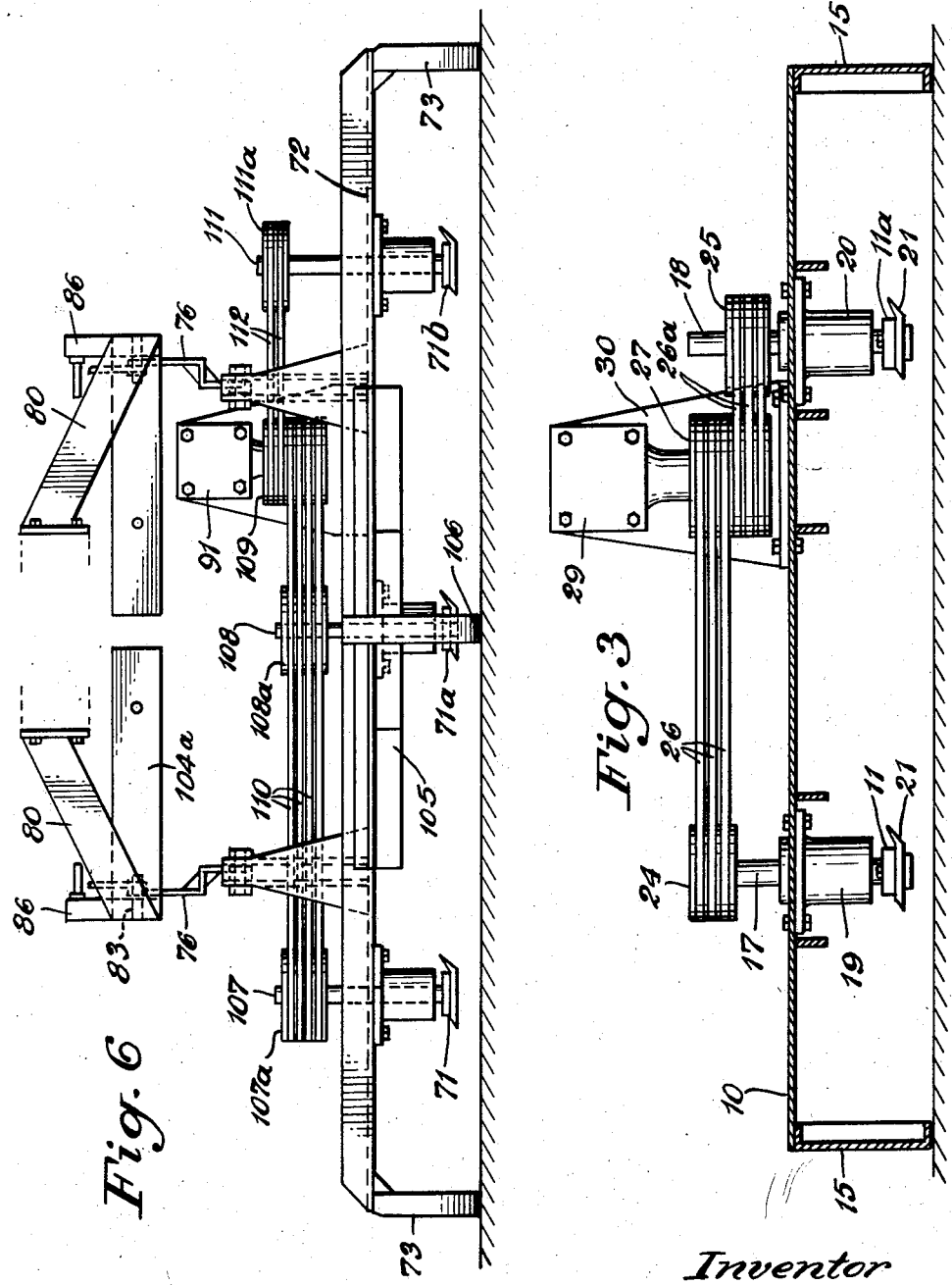
Figure 3 is an enlarged detail section taken on line 3—3 of Figure 1.

Referring now to details of the embodiment of the invention shown in Figures 1 to 3, inclusive, the mower attachment consists essentially of a platform 10 adapted to support two laterally spaced, horizontally rotatable cutters 11, 11a beneath said platform, which cutters are arranged to be driven from a conventional power take-off such as a pulley 12 on the rear end of tractor 13. The platform as a whole is normally suspended closely adjacent the ground between the front and rear wheels 14 and 14a and is attached to the main body of the tractor through a form of linkage connected to the auxiliary frame members on the tractor, which linkage is arranged to raise and lower the platform with respect to the ground, as will presently be described in detail.

The platform 10 has a pair of upright side plates 15, 15 having their bottom edges supported substantially at ground level when the attachment is in cutting position and forming, in effect, a hood for the cutters 11, 11a. The front end 15a of each side plate 15 may be cut away at a rearwardly and downwardly extending angle so that each side plate 15 may take the form of a sled-like runner. A plurality of depending chains 16 may be suspended in spaced relation along the front edge of the platform to arrest flying material which otherwise might be thrown by the cutters through the open front end of the hood.

The cutters 11, 11a are supported on upright shafts 17 and 18, respectively, journalled in depending bearings 19 and 20 suitably connected to the underface of the platform 10, as shown in Figure 3. In the form shown herein, the cutter 11 is offset rearwardly of the cutter 11a, as shown in Figure 2. Each cutter has blades 21, 21 at its opposite ends of any suitable form. The arms 11 and 11a, with their cutters 21, are preferably of such length that the extreme ends of the cutters 21 move in closely adjacent paths during rotation, as indicated by the dot and dash lines 22 and 23 in Figure 2, but owing to the advanced position of the cutter 11 with respect to the cutter 11a, as shown in this figure, the two cutters will cut a full swath extending substantially the full width of the platform between the side plates 15, 15, as the machine advances.

The two shafts 17 and 18 of cutters 11 and 11a project above the platform 10 and have pulleys 24 and 25, respectively, fixed thereon. These pulleys are connected by belts 26 and 26a with a multiple drive pulley 27 fixed on an upright downwardly depending stub shaft 28 journalled in a gear box 29. The gear box 29 is supported by an upstanding bracket 30 fixed on the platform 10 adjacent one side thereof. The gear box 29 encloses conventional beveled gears (not shown) for connecting the stub shaft 28 with a rearwardly extending, horizontal shaft 31 journalled in the rear end of said gear box.

The several drive pulleys and their connecting belts may, if desired, be enclosed in a housing (not shown).

The horizontal shaft 31 has suitable driving connection through universal joint 32, and splined shaft 33 fitting in sleeve 33a of a universal joint 34 with a rearwardly extending shaft 35. The latter shaft is journalled in bearings 36 and 37 on a plate 38 detachably mounted on the rear axle of the tractor by any suitable means. A pulley 39 is fixed on the rear end of the shaft 35 and is connected by flexible drive means, herein consisting of a plurality of belts 40, to the take-off pulley 12 of the tractor.

It will be observed that by reason of the flexible drive connection supported between the horizontal shaft 31 of gear box 29 of the drive shaft 35 connected to the take-off pulley 12, said drive connection is capable of considerable vertical adjustment to adapt the mower unit as a whole to different types of tractors.

The supporting linkage for the mower unit consists essentially of two pairs of levers 45 and 46 at each side of the platform, which levers preferably consist of bell crank levers of substantially the same length and angularity. Each of the bell crank levers 45 consists of a relatively long lower arm 45a and a shorter upper arm 45b. Each longer arm 45a is pivotally connected to an upstanding bracket 47 at the front and adjacent one side of the platform 10.

The front bell crank levers 45 are each pivotally supported intermediate their ends to a fixed part of the tractor. In the form shown, this pivotal support is provided by pivot pins 50 on brackets 51 fixed to and projecting outwardly from the crank case 52 of the tractor and supported longitudinally of the tractor by forwardly and inwardly extending struts 53, 53 also connected to the crank case 52.

Each of the two rear bell crank levers 46 consists of a relatively long lower arm 46a and a relatively shorter arm 46b. The longer arms 46a are connected to a relatively short upstanding bracket 48 adjacent the rear end and toward one side of the platform in substantial longitudinal alignment with the bracket 47 at the front and at the same side of the platform.

Each of the rear bell crank levers 46 are also connected intermediate their ends by a pivot pin 55 to a fixed part on the tractor. In this instance the pivot pin 55 extends transversely between a pair of auxiliary side plates 56 secured at their upper ends to the frame of the tractor and extending downwardly therefrom for supporting the pivot pin 55 adjacent their outer ends. The shorter arms 45b and 46b of the two pairs of bell cranks 45 and 46 adjacent each side of the platform are pivotally connected by an inclined raising and lowering link 49.

With the linkage means just described, it will be understood that the entire mower unit can be raised or lowered by shifting the two connecting links 49, 49 forwardly or rearwardly so as to rock the two pairs of bell crank levers 45 and 46 through substantially equal arcs, thereby adjusting the height of the mower unit, while maintaining it in substantially horizontal planes in all positions of vertical adjustment.

Suitable means are provided for maintaining the two links at a constant angle of inclination during raising and lowering movement. In the form shown, this means includes a pair of hydraulic jacks 60, 60 such as are customarily provided with conventional tractors, and are capable of being positioned at various places on the vehicle for effecting adjustments of different kinds of attachments or implements used with the vehicle. In the form shown herein, the hydraulic jacks 60 are pivotally connected to the rear axle 14b and extend in a rearward direction therefrom with their piston rods 61 pivotally connected to levers 62 pivoted at their upper ends to a fixed portion of the tractor frame. The lower ends of the levers 62 have links 63 pivoted thereto and extending forwardly beneath the rear axle 14b for pivotal connection at 64 with the rear end of the adjacent connecting link 49. The hydraulic jacks 60 are connected by flexible pipes (not shown) to the usual hydraulic system of the tractor, under control of the operator. The arrangement is such that by extending the piston rods 61 rearwardly from the full line position shown in Figures 1 and 2, the bell cranks 45 and 46 will be rocked so as to elevate the entire mower unit and hold it at the desired level above the ground.

Means are provided for limiting the downward movement of the mower unit relative to the frame which herein consists of a length of chain 65 connected between a fixed plate 66 on the tractor frame and the upper end of the bracket 30. This chain allows sufficient vertical movement of the mower unit relative to the frame but prohibits the mower unit from dropping too far in case of failure in the hydraulic lift connections.

A plate 67 is hinged at 68 along the rear edge of the platform 10 in depending relation across a rear opening between end plate sections 69, 69 which are fixed to the platform in front of the rear wheels. The hinged plate 67 serves to arrest flying material such as stones and the like, which may be engaged and thrown by the rotating cutters 11, 11a but does not interfere with rotation of the rear wheels.

Figure 4:
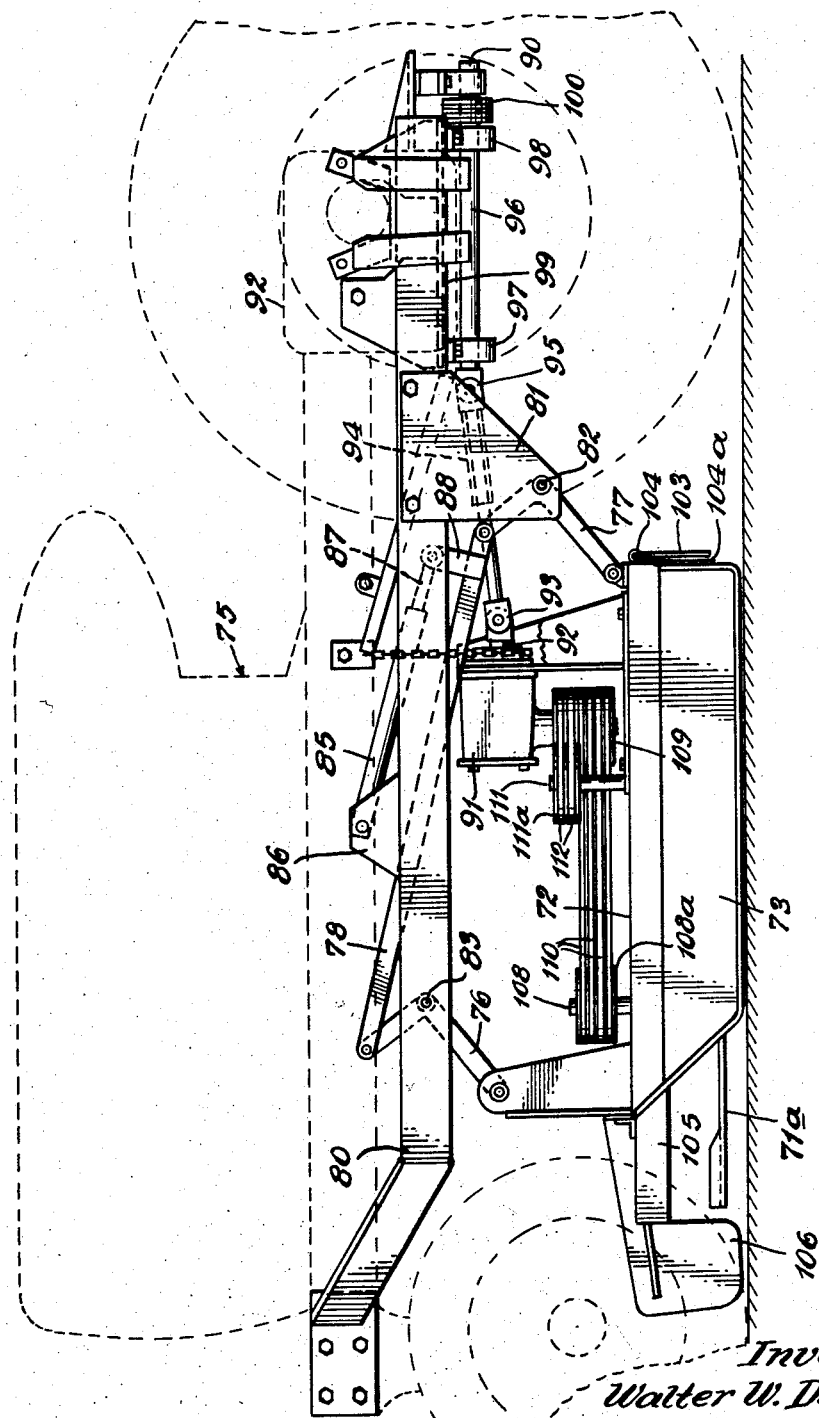
Figure 4 is a side view of a modified form of mower attachment having three rotary mower blades, together with its auxiliary supports for mounting on a conventional tractor shown in phantom.

Referring now to details of the modified form of the invention shown in Figures 4 to 6, inclusive, this form of mower attachment has three rotating cutting blades 71, 71a and 71b supported beneath a platform 72 having side plates 73 corresponding in general to the blades 11, 11a, frame 10 and side plates 15, 15, respectively, of the form of attachment shown in Figures 1 to 3, inclusive.

The linkage arrangement for raising and lowering the mower unit relative to the tractor frame 75 is substantially the same in principle as that previously described in connection with the two-cutter form shown in Figures 1 to 3; that is to say, the mower unit as a whole, including the platform 72, is raised and lowered through two pairs of bell crank levers 76 and 77 at the front and rear, respectively, of the mower unit. The front and rear bell crank levers 76 and 77 toward each side of the frame are connected by links 78 which correspond in function to the links 49 previously described in connection with the two-cutter form of attachment. Generally speaking, however, the form of attachment having three cutters is designed for a larger tractor having a somewhat higher frame and, therefore, this modified attachment may differ in several respects which may now be mentioned.

A pair of auxiliary side bars 80, 80 are connected to opposite sides of the tractor frame and extend in spaced relation along opposite sides thereof. Said frame members include depending brackets 81 near their rear ends which support the pivot pins 82 of the rear bell crank levers 77. The front pivot pins 83 of the front bell crank levers are supported at a substantially higher level near the front end of the auxiliary frame member 80. With this arrangement, the two connecting links 78 are controlled for raising and lowering the mower unit by hydraulic jacks 85 pivoted on upstanding brackets 86 secured to the auxiliary frame members 80 intermediate their ends. The piston rods 87 of the hydraulic jacks are pivotally connected at their rear ends to upstanding members 88 fixed to the connecting links 78 near the rear ends thereof.

It will also be observed in Figure 4 that the rear axle of the tractor is at a somewhat higher level than that of the tractor shown in Figures 1 to 3, and that the power take-off shaft 90 of the tractor is also at a somewhat higher level. Also, the transmission case 92 on the rear axle is somewhat wider transversely of the vehicle so as to necessitate a somewhat different form of mounting for the driving attachment between the power take-off shaft 90 and the mower attachment. In the latter case, the mower attachment platform has a gear box 91 mounted thereon corresponding in arrangement and function to the gear box 29 of the two-cutter type attachment. From this gear box a flexible drive connection is provided to the power take-off shaft 90 by a horizontal shaft 92, universal joint 93, splined shaft 94, universal joint 95 and a shaft 96 journalled in bearings 97 and 98 on a plate 99, which in this form of attachment may be fixed on one of the auxiliary side frame members 80. A pulley 100 is fixed on the rear end of the shaft 96 and is connected by belts 101 to a pulley 102 fixed on the power take-off shaft 90.

A plate 103 is hinged at 104 along the rear edge of the platform 72 in depending relation thereto across a rear opening between fixed end plates 104a in front of the rear wheels. The hinged plate 103 serves to arrest flying material, such as stones and the like, which may be engaged by the rotating cutters, but does not interfere with rotation of the rear wheels.

The forwardmost, center cutter 71a extends beneath a forwardly extending projection 105 of the platform 72. A vertical plate 106 depends downwardly from the front end of the extension 105 at the center of the mower attachment to form a sled-like runner to aid in protecting the adjacent cutter 71a against damage.

A plurality of chains may be carried in depending relation along the front opening of the platform 72 and its extension 105, if desired, in the same manner previously described in connection with the description of the form of attachment shown in Figure 1, but such chains have been omitted in Figures 4, 5 and 6 for convenience in showing other portions of the structure.

The upstanding shafts 107 and 108 of the cutters 71 and 71a have pulleys 107a and 108a, respectively, fixed thereon, which are driven from a multiple pulley 109 below the gear box 91 through a plurality of belts 110. The upstanding shaft 111 of the third cutter 71b has a pulley 111a thereon driven by a series of belts 112 from the multiple pulley 109.

Although I have shown and described certain embodiments of my invention, it will be understood that various changes and modifications may be made without departing from the spirit and scope of the invention as defined by the appended claims.

I claim:

1. A level rising mower attachment mounted between the front and rear wheels of a tractor including a platform, a plurality of cutter shafts journaled in bearings beneath the platform, said shafts carrying cutter blades at their lower ends and projecting upwardly above the platform, a gear box carried by the platform and mounted thereabove, said gear box having a stub shaft extending downwardly toward the platform, power connections between the stub shaft and the cutter shafts, a power connection between the gear box and a power takeoff point on the tractor, and means for maintaining the platform level during raising and lowering to thereby maintain an even weight distribution at the platform support points including a first set of bell cranks having their lower ends pivotally connected to members extending a substantial distance upwardly above the platform, a second set of bell cranks having their lower ends pivotally connected to the platform to the rear of the first pair of bell cranks, a pair of inclined raising links, each link having one end pivotally connected to the upper end of one of the first bell cranks and its other end pivotally connected to the upper end of one of the second bell cranks, said bell cranks being pivotally connected at their midportions to a support fixed with respect to the tractor at all times, and a raising and lowering assembly mounted on the tractor and operatively associated with the links for maintaining the links at a constant angle of inclination during raising and lowering movement.

2. The mower attachment of claim 1 wherein the raising and lowering assembly includes a fluid operated jack fixed with respect to the tractor body, said jack having a piston pivotally connected to a lever which in turn is pivoted to the tractor at one end and operatively connected to the raising link at the other.

3. A level rising mower attachment mounted between the front and rear wheels of a tractor including a platform, a plurality of cutter shafts journaled in bearings beneath the platform, said shafts carrying cutter blades at their lower ends and projecting upwardly above the platform, a gear box carried by the platform and mounted thereabove, said gear box having a stub shaft extending downwardly toward the platform, power connections between the stub shaft and the cutter shafts, a power connection between the gear box and a power takeoff point on the tractor, and means for maintaining the platform level during raising and lowering to thereby maintain an even weight distribution at the platform support points including a first bell crank having its lower end pivotally connected to a member extending a substantial distance upwardly above the platform, a second bell crank having its lower end pivotally connected to the platform to the rear of the first bell crank, an inclined raising link, said raising link being pivotally connected to the upper end of the first bell crank and to the upper end of the second bell crank, said bell cranks being pivotally connected between their upper and lower ends to a support fixed with respect to the tractor at all times, and a raising and lowering assembly mounted on the tractor and operatively associated with the links for maintaining the links at a constant angle of inclination during raising and lowering movement.

References Cited in the file of this patent

UNITED STATES PATENTS

| | | |
|---|---|---|
| 2,369,850 | Powers | Feb. 20, 1945 |
| 2,514,407 | May | July 11, 1950 |
| 2,578,880 | Doyle | Dec. 18, 1951 |
| 2,659,191 | Miller et al. | Nov. 17, 1953 |
| 2,681,536 | Kuhary et al. | June 22, 1954 |
| 2,688,833 | Weiss et al. | Sept. 14, 1954 |
| 2,690,040 | Miller et al. | Sept. 28, 1954 |
| 2,711,624 | Crump | June 28, 1955 |
| 2,756,833 | Chattin | July 31, 1956 |
| 2,801,510 | Colburn | Aug. 6, 1957 |